July 7, 1931.  W. H. MASON  1,812,970
PROCESS OF MANUFACTURING INSULATING BOARD
Filed Jan. 23, 1929  4 Sheets-Sheet 4
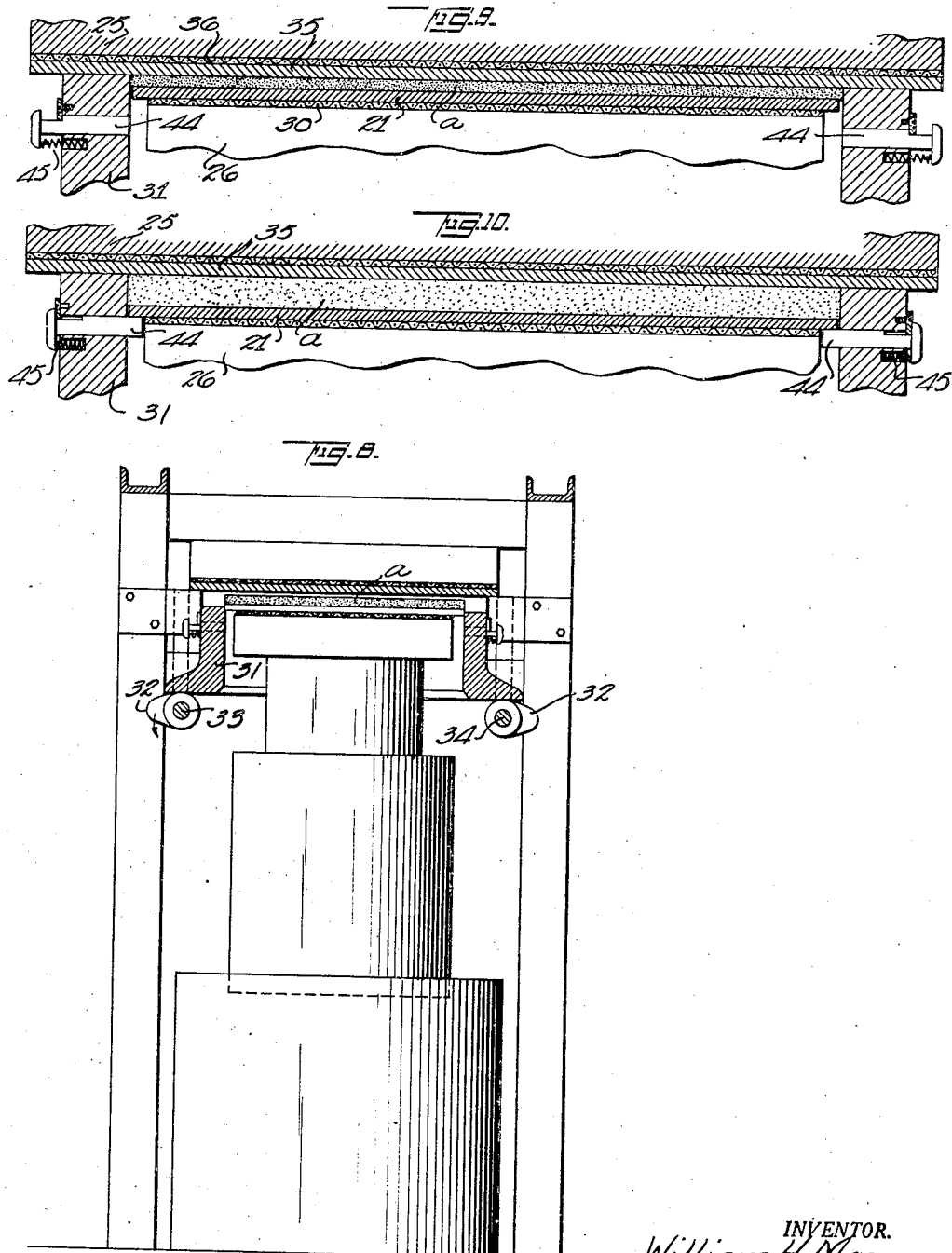

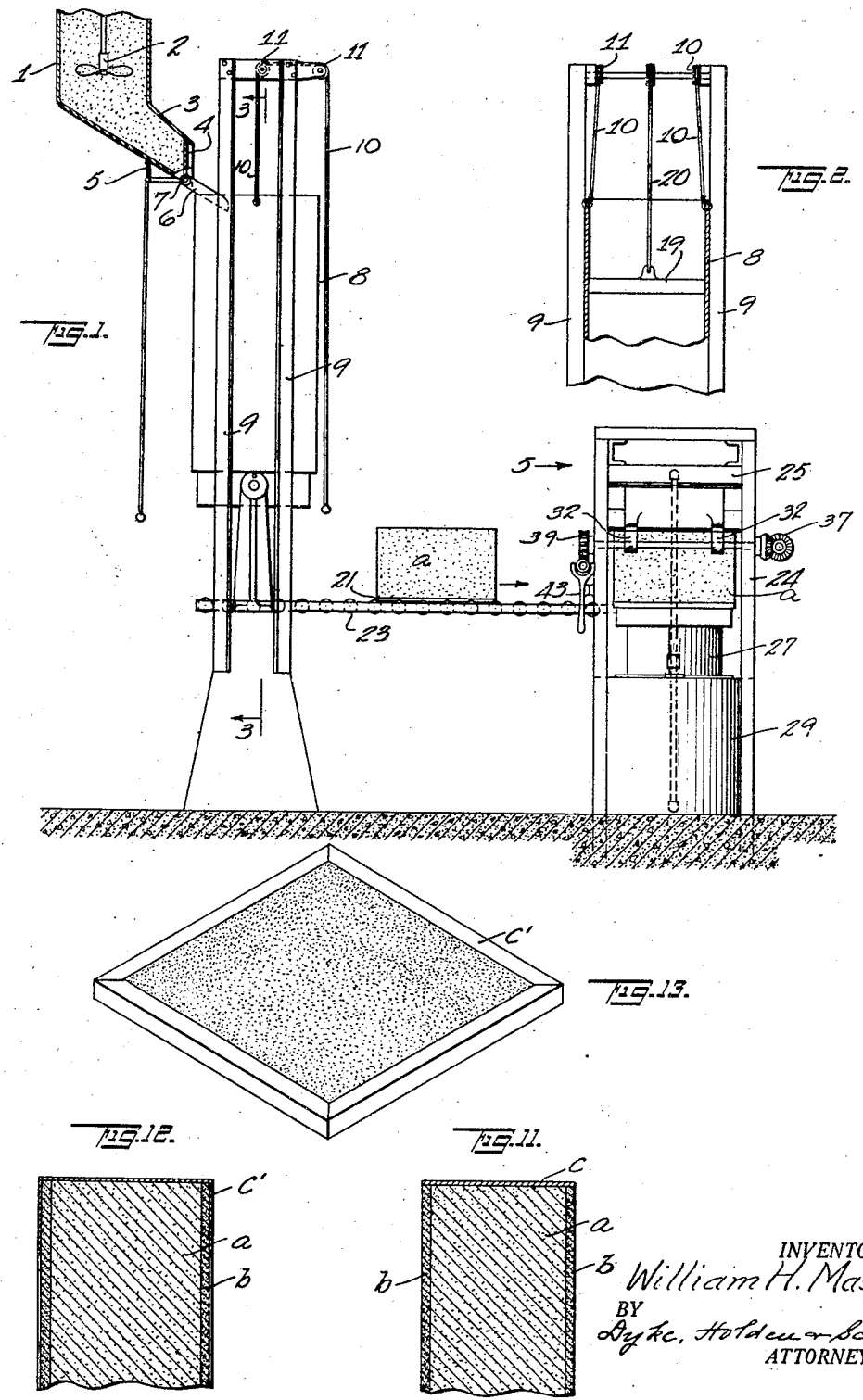

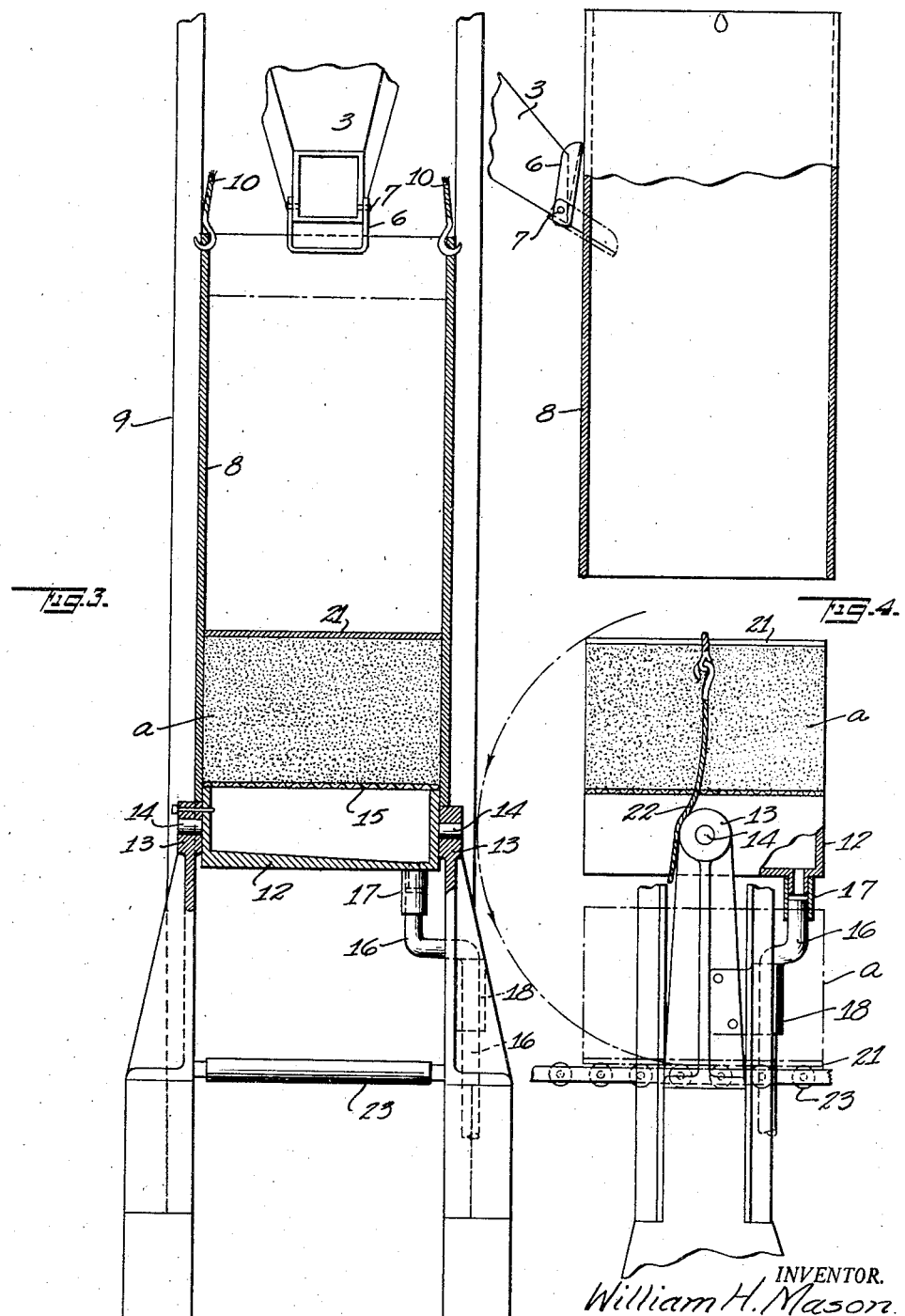

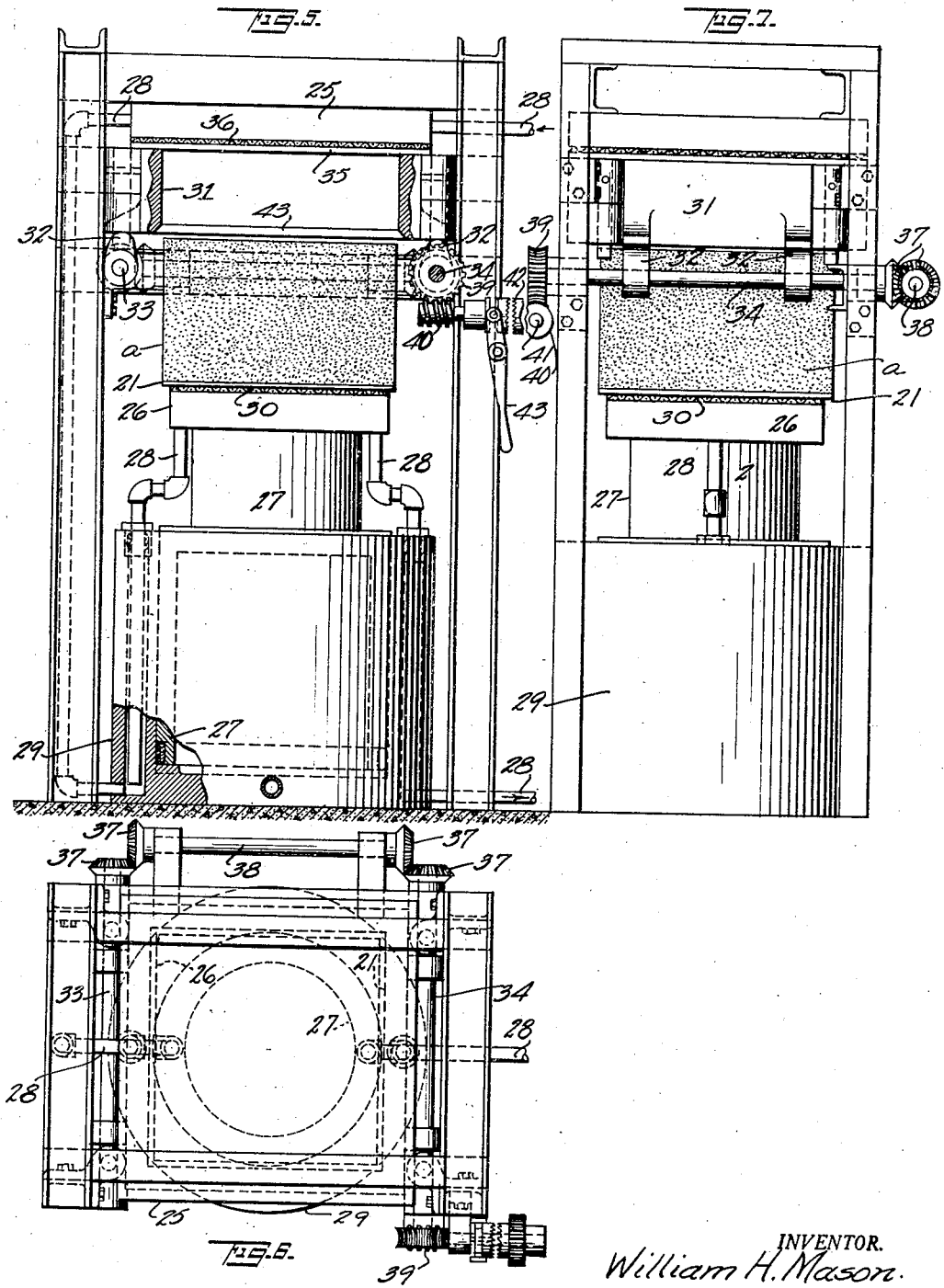

Patented July 7, 1931

1,812,970

UNITED STATES PATENT OFFICE

WILLIAM H. MASON, OF LAUREL, MISSISSIPPI, ASSIGNOR TO MASONITE CORPORATION, OF LAUREL, MISSISSIPPI, A CORPORATION OF DELAWARE

PROCESS OF MANUFACTURING INSULATING BOARD

Application filed January 23, 1929. Serial No. 334,387.

My invention relates to insulating board formed of vegetable fibre and has for one of its principal objects the production of a board the exterior of which has a very high degree of porosity, and the exterior surfaces of which are hard and dense. Such boards are of great strength, and can be manufactured at low cost.

Various raw materials can be used, provided the same contain cellulose together with lignin in sufficient quantity to bind or weld the cellulose fibres together in compact relation when subjected to moisture, heat and pressure. The preferred material is wood chips obtained from saw mill waste.

The raw material is first disintegrated into fibres by any process in which at least the principal part of the lignin is retained, as, for example, the process disclosed and claimed in U. S. Patent No. 1,578,609, granted March 30, 1926, in accordance with which the fibre is obtained by subjecting the wood chips in a closed high pressure chamber to penetration by an elastic fluid such as steam at high pressure, and progressively discharging the same through a constricted outlet from said chamber while substantially maintaining the pressure in the pressure chamber, whereby the sudden expansion of the fluid is utilized for disintegrating the material.

The fibre thus obtained is recovered in a water bath and may be run through beaters or refiners if desired. Such fibres are of graduated fineness and well adapted to be felted together. Very little refining is necessary, and if desired may be entirely dispensed with. The fibre pulp so obtained should preferably be sized with suitable material distributed substantially uniformly throughout to render the final product highly resistant to water and moisture. A suitable process for carrying out this step is disclosed and broadly claimed in my copending application Serial No. 277,382, filed May 12, 1928, and consists briefly in subjecting the fibre to agitation in the water bath with melted petroleum, paraffin or equivalent hydrocarbon at a temperature sufficiently high to prevent congealing of the hydrocarbon.

In U. S. Patent No. 1,663,506 granted March 20, 1928, I have disclosed an insulating board having some of the characteristics of the present invention, together with a process of producing the same.

The improved product and process herein claimed embody improvements whereby the cost of production is lowered and the product will be uniform in quality and of predetermined gauge thickness. Such product is also characterized by extreme porosity of interior and extreme rigidity, compactness and strength of exterior or surface layers.

Reference is hereby made to the accompanying drawings of which

Figure 1 is a front elevation showing an apparatus suitable for carrying out the process of my invention.

Fig. 2 is a side elevation of the sheet forming box, partly broken away.

Fig. 3 is a section on line 3—3 of Fig. 1.

Fig. 4 is a front elevation, partly in section, showing the sheet forming box and parts associated therewith, said box being in elevated position.

Fig. 5 is a side elevation of the press of Fig. 1 as viewed from the left.

Fig. 6 is a plan of Fig. 5.

Fig. 7 is a front elevation of the press of Fig. 1.

Fig. 8 is a side elevation of the press, showing the cam means for raising and lowering the fibre sheet retaining frame.

Fig. 9 is a detail elevation of the press platens and parts associated therewith, the movable platen being in its extreme upper position.

Fig. 10 is a similar view showing the platen depressed from the position of Fig. 9 which means in operative position for gauging the position of the lower surface plate.

Fig. 11 is a detail section of one edge of an insulating sheet made in accordance with my invention.

Fig. 12 is a similar view of a modification.

Fig. 13 is a perspective view of the sheet of Fig. 12.

In carrying out my invention the pulp mixture of lignin, cellulose and water is supplied from a reservoir 1, provided with a mechanically driven agitator 2, discharge chute 3 and gate 4, normally held in closed position by spring 5. A trough 6 is pivoted at 7 to the chute 3 and normally occupies the position shown in Fig. 1 for supplying pulp to the forming box 8. The box 8 is a rectangular structure, preferably of metal and open at both its upper and lower ends. It is mounted within guides 9 for vertical guided movement, and means, for example cables 10, running over pulleys 11 are provided for raising and lowering the same. When in its lowest position, the lower end of the forming box encloses the invertible drain box 12 and rests upon the bearings 13 by which the latter is supported, as shown in Fig. 3.

The drain box 12 is preferably rectangular in form and provided with trunnions 14 which are rotatably mounted in the fixed bearings 13. A screen 15 preferably of wire mesh extends across the top of the drain box, and a drain pipe 16 leads from the bottom thereof to a suitable waste pipe or recovery tank. A sleeve or coupling 17 is provided which enables the pipe 16 to be readily disconnected from the drain box wherever it is desired to invert the drain box, and in such case the pipe 16 will be rotated within the vertical bearing 18 to move it outside the path of movement of the drain box.

In practicing the improved process the forming box 8 being empty and in the position shown in Fig. 1, the gate 4 will be opened and the pulp and water mixture allowed to flow into said box, substantially filling it, whereupon the gate will be closed. The water in said mixture immediately begins to drain away through the screen 15, into the drain box 12 and thence through pipe 16 to a suitable waste pipe or recovery tank. The flow of water may be expedited in various ways, as by applying suction to the pipe 16, either by vacuum pump or by extending pipe 16 downwardly to a sufficient distance to enable the descending water column to apply suction to the drain box. Another means for expediting the drainage of the water is shown as a weight 19, Fig. 2, which rests upon the pulp mixture and may be used either in conjunction with the suction means above described or alone. The weight 19 may be raised and lowered by means of a cable 20.

In place of the weight 19, I may use a surface plate 21, Figs. 3 and 4, which is preferably of metal, for example, chromium plated steel, and of slightly less area than the internal area of the forming box so that it rests upon the pulp mixture and descends by gravity as the pulp mixture settles in the box. Obviously the plate 21 may be used either alone or in conjunction with the weight 19 and/or suction means previously described.

After the free water has been drained away, which is quickly accomplished, the forming box 8 is raised by cables 10 to the position of Fig. 4, leaving the wet felted fibre sheet a upon the drain box with the surface plate 21 upon the upper surface of said sheet. Suitable securing means, for example a rope or cable 22 is passed around the drain box 12, sheet a and surface plate 21, the pipe 16 is disconnected from the drain box and swung to one side thereof, and the box is then turned upon its trunnions into an inverted position and the plate 21 carrying the pulp sheet a is deposited upon a roller conveyor 23. The fastening means 22 is then removed, the drain box is rotated to its initial position, and the pipe 16 is reconnected thereto. Upon lowering the forming box 8 to its initial position, the apparatus is in condition for the forming of another pulp sheet a.

Meanwhile the surface plate 21 and the sheet a already formed will be carried by the conveyor 23 into the press 24. This press is of hydraulic type and comprises the usual frame and fixed top platen 25. There is also a movable platen 26 carried by the ram 27 which is mounted in cylinder 29. Steam pipes 28 are provided for heating the platens by applying steam at any desired pressure to the interior thereof.

The surface plate 21 rests upon a layer of wire mesh screen 30 which may be ordinary window screen and is secured to the platen 26. It retards the flow of heat from the platen 26 to the surface 21 and pulp sheet a.

There is a rectangular metal frame 31 above the platen 26. In its normal position as shown in Figs. 5 and 7 its lower edge is above the upper surface of the pulp sheet a. The frame 31 is supported in such position by two pairs of cams 32 carried respectively by horizontal shafts 33 and 34. When in this position the upper surface plate 35 which rests upon said frame 31 and is removable therefrom is held firmly against the layer of wire mesh screen 36 which is similar to the screen 30 and is affixed to the platen 25 for a similar purpose. The surface plate 35 is preferably of chromium plated steel.

The shafts 33 and 34 are geared together by bevel gears 37 and horizontal shaft 38, and there is a worm gear 39 on shaft 34 in engagement with worm 40 mounted on a horizontal shaft 41. A clutch 42 operable by lever 43 serves to connect shaft 41 with a driving shaft when desired to operate the cam shafts 33 and 34 for raising and lowering the frame 31.

The lower edge 43 of frame 31 is beveled to facilitate entrance of sheet a within said frame. Means are provided to act as gauges for determining the thickness of the finished sheet. As shown such means comprise headed pins 44 which are normally held in position of Fig. 9 by coil springs 45. They may be moved inward to the position of Fig. 10 and held by releasable catches (not shown).

Assuming the press to be in position of Fig. 5, the ram 27 being at the limit of its downward movement, hydraulic pressure is applied thereto and the ram rises carrying with it the platen 26, surface plate 21 and pulp sheet a. The sheet enters the frame 31 and will be rapidly and highly compressed as shown in Fig. 9. Much of the water content is expressed during such operation, finding an outlet between the edges of the surface plate 21 and frame 31.

While I do not limit myself to any particular values of moisture content, fineness of fibre, pressure, heat of platens, duration of application of heat and pressure, ultimate thickness of finished sheet, or relative densities of center and outside portions thereof, I find that a very fluid mixture of pulp fibre and water of an original depth of 6' or 8' in the forming box, can be drained therein to a thickness or depth of approximately 18" to 24" and thereupon compressed in the press to a thickness of 3/4", which may be accomplished by a pressure of 400 lbs. per sq. inch. The heat of the platens may vary considerably, for example from 220° F. to several hundred degrees F.

The length of time during which the material is subjected to heat and high pressure is variable and depends upon how thick it is desired to make the dense skin or surface portions, also upon the pressure, temperature and material employed. Ordinarily 10 to 60 seconds will suffice, and the ram and platen 26 are then dropped from the position of Fig. 9 to that of Fig. 10, the pins 44 having been shifted inward to limit the descent of the surface plate 21. The ram and platen may be dropped quickly because although the sheet a is permeated by steam at high pressure due to the evaporation of a portion of its water content, there is no danger of damaging the sheet by the sudden escape of steam therefrom since it is firmly supported on both faces by the surface plates and at its edges by the frame 31. Sufficient clearance is provided between the edges of the surface plate 21 and the frame 31 to permit the ready escape of water and steam. The sudden reduction of pressure due to the dropping of the platen 26 from the position of Fig. 9 to that of Fig. 10 causes the expansion of steam within the sheet a which together with the elasticity of the material in its interior which has not become set immediately causes the sheet to expand to completely fill the space between the surface plates 21 and 35, whereby the interior of the sheet becomes very porous.

The platen is held in the position of Fig. 10 for a sufficient time for the material to become set throughout the sheet, so that no further expansion will take place upon further dropping of the platen 26. This step in the process may occupy 20 to 60 seconds or more, in the instance specified, in which the platen 26 drops 1 1/4" from the position of Fig. 9 to that of Fig. 10. This results in a finished sheet of uniform gauge thickness for example 2" in the example given.

The dropping of the platen 26 from the position of Fig. 10 is preferably in two steps—first a slight drop to the position of Fig. 8. Second a drop therefrom to its initial position.

The drop to the position of Fig. 8 is for the purpose of freeing the sheet a from the frame 31. This is accomplished by dropping the frame 31 from the position of Fig. 10 to that of Fig. 8 by operating clutch handle 43 and thereby causing rotation of shafts 33 and 34 and cams 32.

The extent of downward movement of the frame 31 exceeds that of platen 26 and therefore the latter acts as an ejector for pushing the sheet a upwardly and out of the frame 31 so that it may be readily removed from the press. The ram and platen will then be dropped to initial position, the frame elevated by means of shafts 33 and 34 and cams 32 to its original position, and the pins 44 released so as to be moved by the springs 45 to their outer positions, whereupon the press may be used for operating upon another sheet a. The sheets a after removal from the press may still contain a small amount of moisture which can be readily driven off in a drying room.

The product of the foregoing process is a sheet a of great interior porosity with compact surface portions b of great density integral therewith (see Figs. 11 and 12). Such surface portions may be and preferably are highly water resistant by reason of the use of sizing as set forth in my patent application Serial No. 277,382, previously mentioned. The edges of the sheets, however, permit the absorption of water into the porous interior of the sheet and in order to prevent such entrance of water, I may apply thereto by any suitable means, for example, water proof glue, a strip of paper c of sufficient length to completely enclose the four edges of the sheet. Such paper may be of water-resistant character.

The width of the paper strip or tape c may be the same as the thickness of the sheet as in Fig. 11, or, if desired, a paper strip c' of sufficient width to enable its lateral edges to be folded over upon and glued to the side surfaces of the sheet may be used as shown in Figs. 12 and 13. If desired, the pores of the edges of the sheets may be closed by waterproof glue alone, the paper strips c or c' being dispensed with.

I claim:

1. A process of the character described, comprising flowing a fibre and water mixture into a vertically disposed form, draining water from the bottom of the mixture to form a sheet causing relative movement of form and sheet to separate the same, inverting said sheet, inserting same into a press, and expressing water therefrom.

2. A process of the character described, comprising flowing a fibre and water mixture into a vertically disposed form, draining water from the bottom of the mixture to form a sheet causing relative movement of form and sheet to separate the same, securing a surface plate on the upper surface of said sheet, inverting said sheet and surface plate, inserting same into a press, and expressing water from said sheet.

3. A process of the character described, comprising flowing a fibre and water mixture into a vertically disposed form, applying suction to the bottom of the mixture, draining water from the bottom of the mixture to form a sheet causing relative movement of form and sheet to separate the same, securing a surface plate on the upper surface of said sheet, inverting said sheet and surface plate, inserting same into a press, and expressing water from said sheet.

4. A process of the character described, comprising the forming of a wet, felted sheet of fibre containing lignin and cellulose, placing said sheet in a heated press, confining the lateral edges of said sheet, subjecting said sheet to pressure and heat for a sufficient time to cause the formation of an exterior layer of dense, compact, non-porous material, relieving the pressure and permitting the expansion of the compressed sheet to a predetermined thickness, subjecting the expanded sheet to heat and pressure until set, and thereupon releasing said pressure.

5. In a process of the character described, forming from a water bath a sheet of lignin-and-cellulose-containing fibre, subjecting the same to pressure and heat for a time sufficient to form a compact layer on the exterior surface, and thereupon quickly releasing the pressure on said sheet before the interior has become set while confining the edges thereof whereby the unset material is caused to expand.

6. In a process of the character described, forming from a water bath a sheet of lignin-and-cellulose containing fibre, subjecting same to pressure and heat, relieving the pressure while confining the side edges of the sheet and causing same to expand to a predetermined thickness, continuing the application of heat until the material of the sheet is set, and thereupon removing it from the press.

7. In a process of the character described, forming from a water bath a sheet of lignin-and-cellulose-containing fibre, subjecting same to pressure and heat, relieving the pressure while confining the side edges of the sheet and causing same to expand to a predetermined thickness, continuing the application of heat until the material of the sheet is set, and thereupon removing the sheet from the press and drying it.

In testimony whereof, I have signed my name hereto.

WILLIAM H. MASON.

CERTIFICATE OF CORRECTION.

Patent No. 1,812,970.                                    Granted July 7, 1931, to

WILLIAM H. MASON.

It is hereby certified that error appears in the printed specification of the above numbered patent requiring correction as follows: Page 1, line 46, for the word "petroleum" read petrolatum; and that the said Letters Patent should be read with this correction therein that the same may conform to the record of the case in the Patent Office.

Signed and sealed this 1st day of September, A. D. 1931.

(Seal)                                                        M. J. Moore,
Acting Commissioner of Patents.